United States Patent Office 2,759,945
Patented Aug. 21, 1956

2,759,945

NICOTINIC ACID ESTERS OF PYRANMETHANOL

Floyd E. Anderson, Yonkers, N. Y., assignor to Nepera Chemical Co., Inc., Yonkers, N. Y., a corporation of New York No Drawing. Application May 18, 1954,
Serial No. 430,737

8 Claims. (Cl. 260—295.5)

The present invention relates to certain novel esters of nicotinic acid and relates more particularly to the tetrahydropyranylmethyl esters of nicotinic acid having the formula

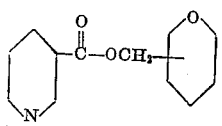

The novel esters of my invention are useful therapeutically and, particularly, because of their ability to produce hyperemia of a degree, intensity and duration exceeding that produced by known nicotinic acid esters.

An object of this invention is the preparation of esters of nicotinic acid capable of producing a pronounced hyperemia which is not only of long duration but is also of a satisfactorily high order of intensity.

Another object of this invention is the production of hyperemia-producing nicotinic acid esters which may be utilized in combination with other therapeutically active materials to promote the absorption of the latter through the skin.

Other objects of this invention will appear from the following detailed description.

The novel esters of my invention may be prepared in the usual way, utilizing known reactions as by reacting nicotinic acid or a functional derivative of the acid, i. e., the acid chloride, with 2-tetrahydropyranylmethyl alcohol or with the corresponding 3- or 4- isomer. The novel esters of my invention may also be obtained by reacting a lower alkyl ester of nicotinic acid such as methyl nicotinate with a tetrahydropyranylmethyl alcohol so that a transesterification reaction takes place yielding the desired tetrahydropyranylmethyl nicotinate together with methyl alcohol as a by-product. The esters obtained are oils of a relatively high boiling point, but the 4-isomer is crystalline.

In order further to illustrate my invention but without being limited thereto, the following examples are given:

Example I 123.1 parts by weight of nicotinic acid are added to 158.2 parts by weight of anhydrous pyridine and, while cooling the mixture, 119 parts by weight of thionyl chloride are gradually added. When the addition is complete, the reaction mixture is heated for one hour at 100° C. To this mixture are then added 69.7 parts by weight of 2-tetrahydropyranylmethyl alcohol and the resulting mixture heated at about 100° C. for three hours. After cooling, the reaction product is poured into 700 parts by weight of water and concentrated ammonium hydroxide is then added until the mixture is alkaline. The alkaline mixture is extracted several times with ether, the ether extracts combined and dried over anhydrous magnesium sulfate. The ether is distilled off and the oily residue which remains is fractionated. The fraction which boils at 145–148° C. at 2 mm. mercury pressure is 2-tetrahydropyranylmethyl nicotinate having the formula

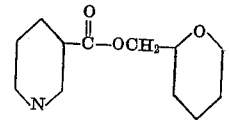

The refractive index of this ester is $n_D^{20} = 1.5189$. Nitrogen analysis for $C_{12}H_{15}NO_3$ is:

Calculated_____ Percent N
Found_____ 6.33
_____ 6.30

Example II 61.55 parts by weight of nicotinic acid are refluxed with 178 parts by weight of thionyl chloride for 24 hours and the excess, unreacted thionyl chloride distilled off. The acid chloride of nicotinic acid hydrochloride thus obtained is mixed with dry toluene and the latter distilled off at reduced pressure to remove all traces of thionyl chloride. 25 parts by weight of 4-tetrahydropyranylmethyl alcohol are added to the hydrochloride of nicotinic acid chloride remaining after the toluene has been removed and an exothermic reaction takes place. The mixture is then heated to 60° C. and maintained at this temperature for 18 hours. After cooling, a layer of chloroform is placed on the reaction mixture and dilute (1:1) ammonium hydroxide added to the aqueous layer until it has a pH of 8.0. A further addition of water is made and the mixture then agitated to extract it with the chloroform present. The chloroform extraction is repeated several times, the extracts combined and then fractionated to separate the 4-tetrahydropyranylmethyl ester of nicotinic acid. The latter boils at 143–147° C. at 0.3 mm. pressure and on cooling crystallizes. The crystalline ester melts at 59–60° C. Nitrogen analysis for $C_{12}H_{15}NO_3$ is:

Calculated_____ Percent N
Found_____ 6.33
_____ 6.77

3-tetrahydropyranylmethyl nicotinate is obtained similarly by reacting 3-hydroxymethyl tetrahydropyran and nicotinic acid chloride.

It is understood that the foregoing detailed description is given merely by way of illustration and that many variations may be made therein without departing from the spirit of my invention.

Having described my invention, what I desire to secure by Letters Patent is:

1. The nicotinic acid esters of the formula

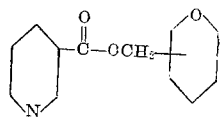

2. 2-tetrahydropyranylmethyl nicotinate.
3. 3-tetrahydropyranylmethyl nicotinate.
4. 4-tetrahydropyranylmethyl nicotinate.
5. Process for the production of the nicotinic acid esters of the formula

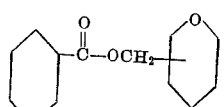

which comprises reacting a tetrahydropyranylmethyl alcohol with a number of the group consisting of nicotinic acid and ester-forming derivatives thereof.

6. Process for the production of 2-tetrahydropyranylmethyl nicotinate, which comprises reacting nicotinic acid chloride with 2-tetrahydropyranylmethyl alcohol.

7. Process for the production of 3-tetrahydropyranylmethyl nicotinate, which comprises reacting nicotinic acid chloride with 3-tetrahydropyranylmethyl alcohol.

8. Process for the production of 4-tetrahydropyranylmethyl nicotinate, which comprises reacting nicotinic acid chloride with 4-tetrahydropyranylmethyl alcohol.

References Cited in the file of this patent
UNITED STATES PATENTS

| | | |
|---|---|---|
| 2,485,152 | Hartmann et al. | Oct. 18, 1949 |
| 2,514,156 | Geyer et al. | July 4, 1950 |
| 2,524,838 | Schlapfer | Oct. 10, 1950 |